US010514789B2

(12) United States Patent
Zhan et al.

(10) Patent No.: US 10,514,789 B2
(45) Date of Patent: Dec. 24, 2019

(54) INTEGRATED TOUCH CONTROL DISPLAY PANEL AND DISPLAY DEVICE

(71) Applicants:Xiamen Tianma Micro-Electronics Co., Ltd, Xiamen (CN); Tianma Micro-Electronics Co., Ltd., Shenzhen (CN)

(72) Inventors: Xiaojing Zhan, Xiamen (CN); Zhiwei Zheng, Xiamen (CN); Wenqiang Yang, Xiamen (CN); Kangpeng Yang, Xiamen (CN); Ying Sun, Xiamen (CN); Yumin Xu, Xiamen (CN)

(*) Notice: Subject to any disclaimer, the term of this patent is extended or adjusted under 35 U.S.C. 154(b) by 34 days.

(21) Appl. No.: 15/362,831

(22) Filed: Nov. 29, 2016

(65) Prior Publication Data
US 2017/0123546 A1    May 4, 2017

(30) Foreign Application Priority Data

Jul. 29, 2016   (CN) .......................... 2016 1 0617522

(51) Int. Cl.
*G06F 3/041*      (2006.01)
*G02F 1/1333*     (2006.01)
(Continued)

(52) U.S. Cl.
CPC ........ *G06F 3/0412* (2013.01); *G02F 1/13338* (2013.01); *G02F 1/133512* (2013.01); *G02F 1/133514* (2013.01); *G02F 1/134336* (2013.01); *G02F 1/136286* (2013.01); *G06F 3/047* (2013.01); *G02F 2001/136295* (2013.01); *G02F 2201/121* (2013.01); *G06F 2203/04111* (2013.01); *G06F 2203/04112* (2013.01)

(58) Field of Classification Search
CPC .... G09G 3/044; G09G 3/047; G02F 1/13338; G02F 1/133512
See application file for complete search history.

(56) References Cited

U.S. PATENT DOCUMENTS

2013/0294030 A1    11/2013   Kuriki et al.
2013/0294037 A1*   11/2013   Kuriki ...................... H05K 9/00
                                                          361/748
(Continued)

OTHER PUBLICATIONS

Examination Report of Indian Patent Application No. 201624041543 dated Jun. 29, 2019.

*Primary Examiner* — Kevin M Nguyen
(74) *Attorney, Agent, or Firm* — Kilpatrick Townsend & Stockton, LLP (57) ABSTRACT

An integrated touch display panel and display device are disclosed. The integrated touch display panel comprises a touch emitting electrode array, a touch sensing electrode array, a black matrix, and color filters. The forward projection of any one of the touch sensing electrodes to the touch emitting electrode array at least partially overlaps with any one of the touch emitting electrodes. The black matrix comprises a plurality of black matrix rows and a plurality of black matrix columns. The color filters are separated by each of the black matrix rows and each of the black matrix columns, to form a plurality of array arrangements of display pixels. The touch sensing electrode is a mesh electrode, and the black matrix at least partially covers an orthogonal projection of the mesh electrodes to the black matrix.

14 Claims, 7 Drawing Sheets

(51) Int. Cl.
    *G02F 1/1335*      (2006.01)
    *G02F 1/1343*      (2006.01)
    *G02F 1/1362*      (2006.01)
    *G06F 3/047*      (2006.01)

(56) References Cited

U.S. PATENT DOCUMENTS

| | | | | |
|---|---|---|---|---|
| 2013/0314371 A1* | 11/2013 | Lee | ................ | G06F 3/0412 345/174 |
| 2015/0022737 A1* | 1/2015 | Lee | ................ | G02F 1/13338 349/12 |
| 2015/0219970 A1* | 8/2015 | Liu | ................ | G02F 1/29 349/12 |
| 2016/0132154 A1* | 5/2016 | Lee | ................ | G06F 3/044 345/174 |

* cited by examiner

INTEGRATED TOUCH CONTROL DISPLAY PANEL AND DISPLAY DEVICE

CROSS-REFERENCE TO RELATED APPLICATION

This application is related to and claims priority from Chinese Application No. 201610617522.5, filed on Jul. 29, 2016, entitled "INTEGRATED TOUCH DISPLAY PANEL AND DISPLAY DEVICE", the entire disclosure of which is hereby incorporated by reference.

TECHNICAL FIELD

The present disclosure relates to the field of display technologies, and particularly to an integrated touch display panel and display device.

BACKGROUND

In the existing touch display devices, the touch function is mainly achieved by means of two layers of touch electrodes, where each layer of touch electrodes include a plurality of strips of touch electrodes arranged in parallel. The two layers of touch electrodes are orthogonal to each other. A touch excitation signal is applied to each strip of touch electrodes. When a person's finger contacts the touch screen, a coupling capacitor is formed between the finger and some touch electrodes on the touch screen, and a leakage current flows from the coupling capacitor. A touch detecting circuit determines the two strips of orthogonally intersected touch electrodes on the two layers of touch electrodes that form the coupling capacitor with the finger by detecting the leakage current, so as to determine the touch position. In the prior art, a transparent conductive material, for example indium tin oxide (ITO), is generally used to fabricate the touch electrode. However, the transparent conductive material has a large resistance, causing an inadequate sensitivity in touch detection.

To solve the problem of large resistance occurring when a transparent conductive material is used to fabricate the touch electrode, a technology exists in which a metal mesh electrode is employed as the touch electrode.

Figure 1:
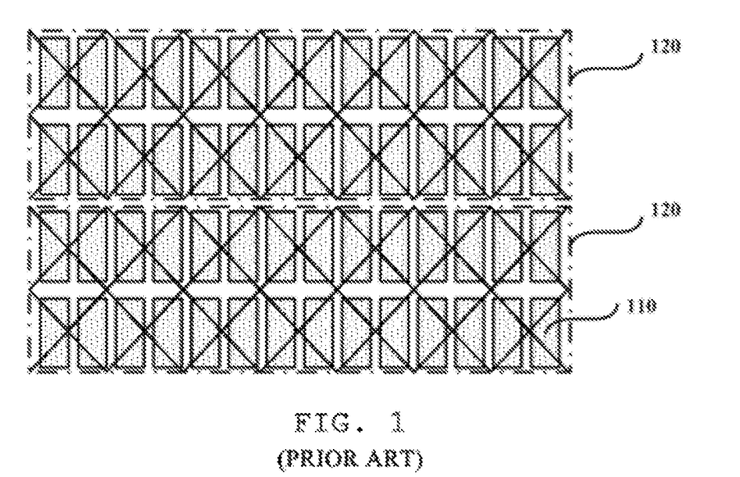
FIG. 1 is a schematic structural diagram showing a mesh touch electrode of an integrated touch display panel in a prior-art.

FIG. 1 is a structural diagram showing the corresponding positional relationship between a metal mesh touch sensing electrode and pixels in an existing touch display device. The touch display device shown in FIG. 1 includes pixel arrays (for example, the shadowed region as shown in FIG. 1) and metal mesh touch sensing electrodes 120. The pixel arrays include a plurality of array arrangements of pixels 110, and the touch sensing electrode 120 is formed by interleaved metal wires.

However, in the prior art as shown in FIG. 1, the metal wires of the metal mesh touch sensing electrode 120 are generally obliquely wired, and run through a light transmissible region of the pixels 110. As a result, when a touch display device including the metal mesh electrode as shown in FIG. 1 displays a dark image, or when working with intense ambient light, the metal mesh touch sensing electrode 120 is visually noticeable to the naked eyes, thus affecting the display effect.

SUMMARY

In view of the aforementioned defects or disadvantages existing in the prior art, an integrated touch display panel and display device are desired, so as to solve the technical problems existing in the prior art.

In a first aspect, an embodiment in accordance with of the present disclosure provides an integrated touch display panel, comprising a touch emitting electrode array, a touch sensing electrode array, a black matrix, and color filters. The touch emitting electrode array comprises a plurality of touch emitting electrodes arranged along a first direction. The touch sensing electrode array comprises a plurality of touch sensing electrodes arranged along a second direction. An orthogonal projection of any one of the touch sensing electrodes to the touch emitting electrode array at least partially overlaps with any one of the touch emitting electrodes. The black matrix comprises a plurality of black matrix rows arranged along the first direction and a plurality of black matrix columns arranged along the second direction. The color filters are separated by each of the black matrix rows and each of the black matrix columns, to form a plurality of array arrangements of display pixels. The touch sensing electrode is a mesh electrode, and the black matrix at least partially covers an orthogonal projection of the mesh electrodes to the black matrix.

In a second aspect, an embodiment in accordance with the present disclosure further provides an integrated touch display device comprising the integrated touch display panel as described above.

According to the solution provided in the embodiment in accordance with the present disclosure, the mesh touch sensing electrode is disposed in a separating region between adjacent pixels, such that at least a part of the wiring of the touch sensing electrodes is covered by the black matrix without passing through a light transmissible region of the pixels. As a result, regardless of the ambient light conditions and/or images displayed by the integrated touch display panel and display device, the touch sensing electrode is not visually noticeable to the naked eyes, thereby improving the display effect of the integrated touch display panel and display device of the present disclosure.

BRIEF DESCRIPTION OF THE DRAWINGS

Other features, purposes and advantages of the present disclosure will become more apparent from reading of the detailed description of the non-limiting embodiments given in conjunction with the accompanying drawings, in which.

DETAILED DESCRIPTION OF EMBODIMENTS

The present disclosure will be further described below in detail with reference to the accompanying drawings and embodiments. It should be understood that the specific embodiments described herein is only intended to explain the present invention, and is not taken to limit the present invention. Further, it should be noted that the accompanying drawings only show parts that are pertinent to the invention for ease of description.

It should be noted that, in a case without conflicts, the embodiments and features thereof in the present disclosure may be combined with each other. The present disclosure will be described below in detail with reference to the accompanying drawings and embodiments.

Figure 2:
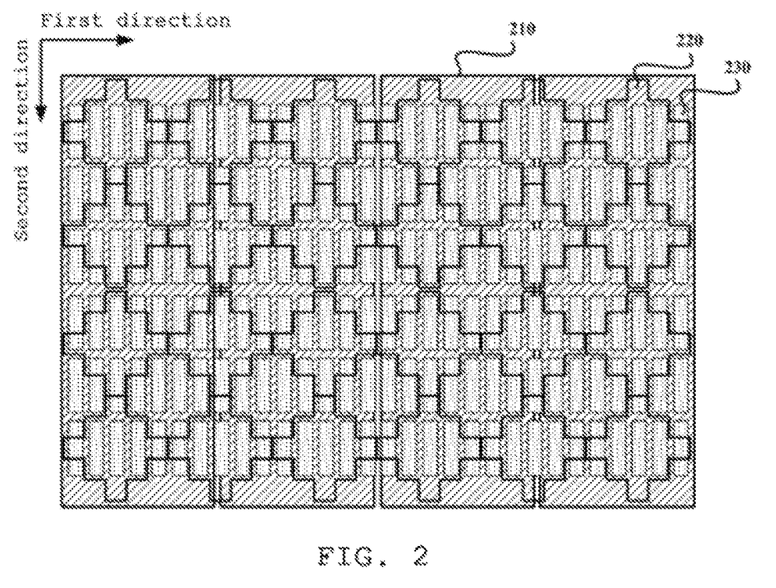
FIG. 2 is a schematic structural diagram showing the corresponding positional relationship between a touch sensing electrode array and a display pixel array in an integrated touch display panel according to an embodiment in accordance with the present disclosure.

FIG. 2 is a schematic structural diagram showing the corresponding positional relationship between a touch sensing electrode array, a touch emitting electrode array, and a display pixel array in an integrated touch display panel according to an embodiment of the present disclosure.

In this embodiment, the integrated touch display panel includes a touch emitting electrode array, a touch sensing electrode array, a black matrix (not shown), and color filters (not shown).

The touch emitting electrode array includes a plurality of touch emitting electrodes 210 arranged along a first direction. The touch sensing electrode array includes a plurality of touch sensing electrodes 220 arranged along a second direction. An orthogonal projection of any one of the touch sensing electrodes 220 to the touch emitting electrode array at least partially overlaps with any one of the touch emitting electrodes 210.

The black matrix includes a plurality of black matrix rows arranged along the first direction and a plurality of black matrix columns arranged along the second direction. The color filters are separated by each of the black matrix rows and each of the black matrix columns, to form a plurality of array arrangements of display pixels 230. That is to say, in FIG. 2, a black matrix column is formed between two adjacent display pixel columns, and a black matrix row is formed between two adjacent display pixel rows.

Herein, the integrated touch display panel according to various embodiments of the present disclosure may include a plurality of color filters having different colors, such that the display pixels separated by the black matrix can display different colors.

Further, in the integrated touch display panel according to this embodiment, the touch sensing electrode is a mesh electrode, and the black matrix at least partially covers an orthogonal projection of the mesh electrodes to the black matrix. That is to say, in the integrated touch display panel according to this embodiment, a part of wiring forming the mesh electrodes is located in a separating region between adjacent display pixels 230, and thus such a part of wiring is covered by the black matrix. As a result, regardless of the ambient light conditions or images displayed by the integrated touch display panel, such a part of wiring of the mesh electrodes covered by the black matrix is not visually noticeable to the naked eyes, and thus will not bring any adverse effect to the display effect.

In the integrated touch display panel according to various embodiments, the mesh electrode, as a touch sensing electrode, may be a metal mesh electrode. The mesh electrode may be fabricated with metal, such that the touch sensing electrode has a low resistance, thereby further improving the sensitivity of touch detection. The metal for fabricating the mesh electrode may be aluminium, titanium, silver, molybdenum, tungsten, copper, chromium, or an alloy thereof.

Figure 3:
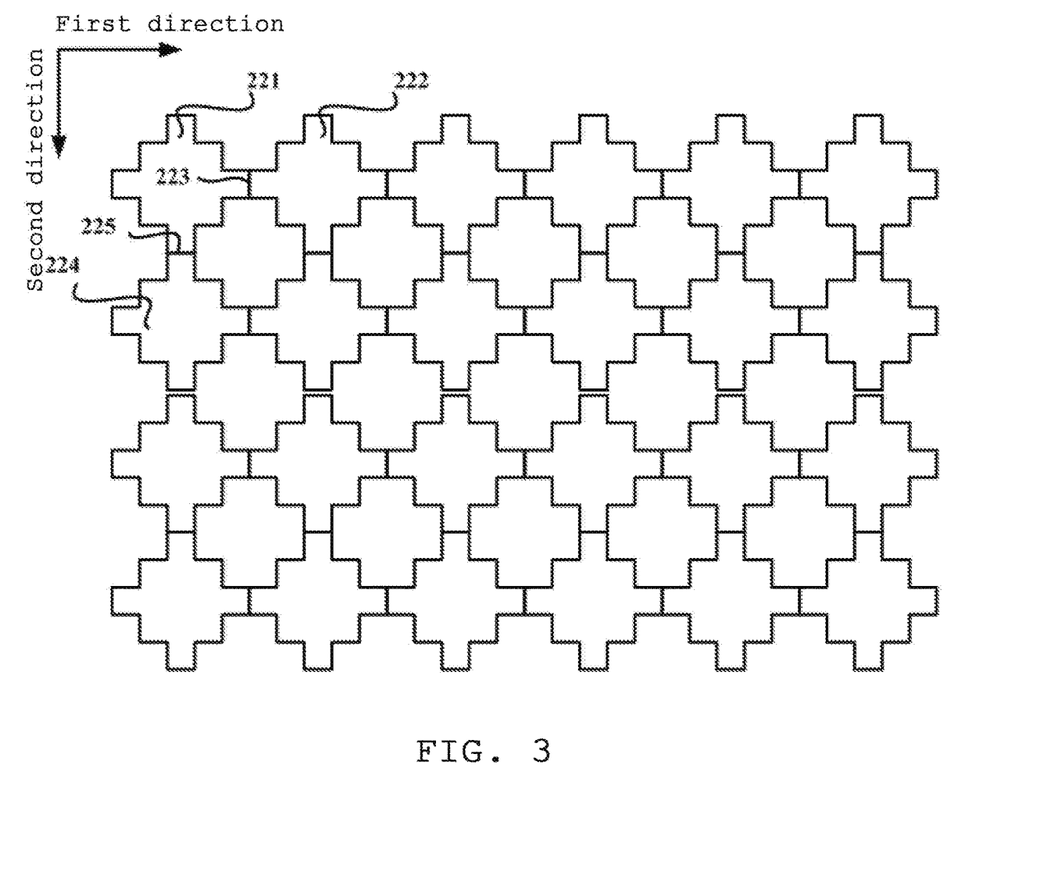
FIG. 3 is a schematic structural diagram of the touch sensing electrode array shown in FIG. 2.

FIG. 3 is a schematic structural diagram of the touch sensing electrode shown in FIG. 2.

The touch sensing electrode includes a plurality of first metal wire grids. In a given touch sensing electrode, each of two adjacent first metal wire grids in the first direction has a side overlapping a side of the other. For example, as shown in FIG. 3, each of a first metal wire grid 221 and a first metal wire grid 222 adjacent in the first direction has a side 223 overlapping a side of the other.

In addition, in a given touch sensing electrode, each two adjacent first metal wire grids in the second direction may also have a side overlapping a side of the other. For example, as shown in FIG. 3, each of the first metal wire grid 221 and a first metal wire grid 224 adjacent in the second direction has a side 225 overlapping a side of the other. As a result, a plurality of electrically conductive paths can be formed between individual first metal wire grids of adjacent rows, through the plurality of sides overlapping with each other, and thus avoiding the potential occurrence of open circuit of the entire touch sensing electrode due to a broken metal wire at a certain position.

Figure 4:
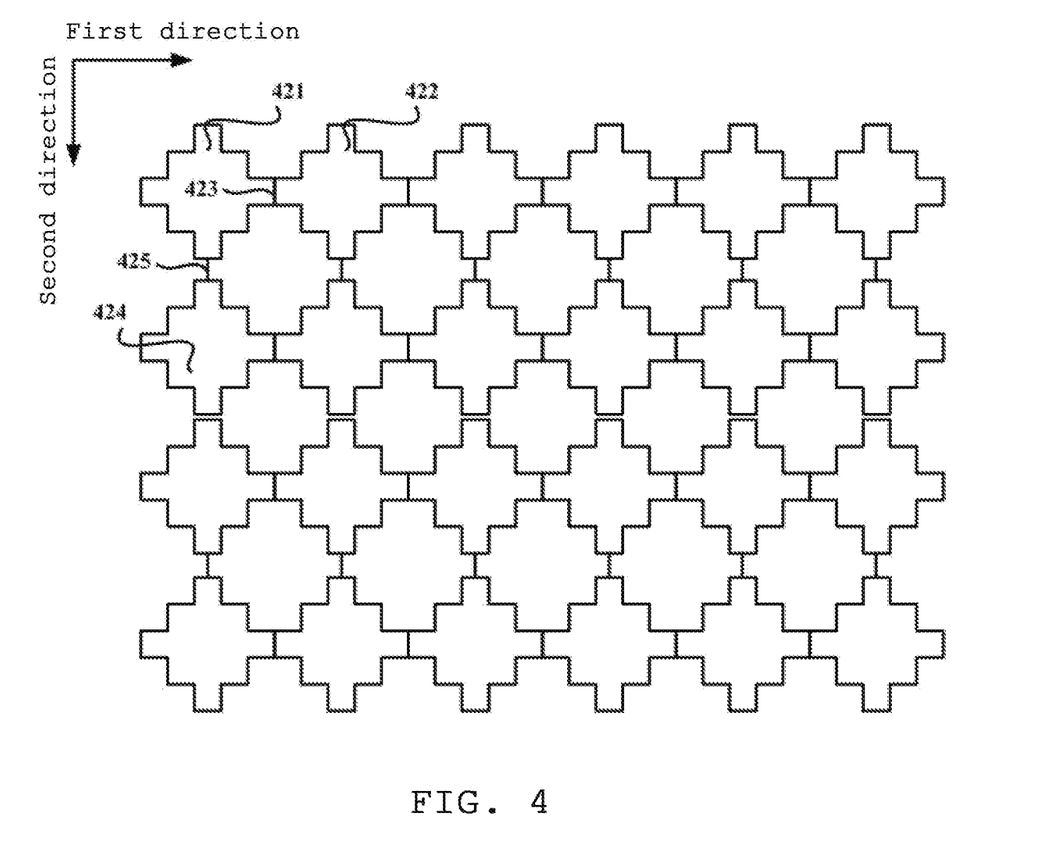
FIG. 4 is a schematic structural diagram of another optional implementation of the touch sensing electrode array.

FIG. 4 shows a structure of another optional implementation of the touch sensing electrode in the integrated touch display panel according to this embodiment.

Similar to FIG. 3, in the touch sensing electrode array shown in FIG. 4, in a given touch sensing electrode, each of two adjacent first metal wire grids in the first direction has a side overlapping a side of the other. For example, as shown in FIG. 4, each a first metal wire grid 421 and a first metal wire grid 422 adjacent in the first direction has a side 423 overlapping a side of the other.

Unlike FIG. 3, in FIG. 4, the touch sensing electrode further includes a plurality of first metal connecting wires. In a given touch sensing electrode, two first metal wire grids adjacent in the second direction are electrically connected through at least one of the first metal connecting wires. For example, as shown in FIG. 4, the first metal wire grid 421 and a first metal wire grid 424 adjacent in the second direction are electrically connected through a first metal wire 425. As a result, a plurality of electrically conductive paths can be formed between individual first metal wire grids of adjacent rows, through the plurality of first metal wires, and thus avoiding the potential occurrence of open circuit of the entire touch sensing electrode due to a broken metal wire at a certain position.

In some optional implementations, the first metal wire grid may be a concave polygon shape. At least part of the sides of the concave polygon shape may be located between adjacent display pixels, and reside within the coverage of the black matrix.

Figure 5:
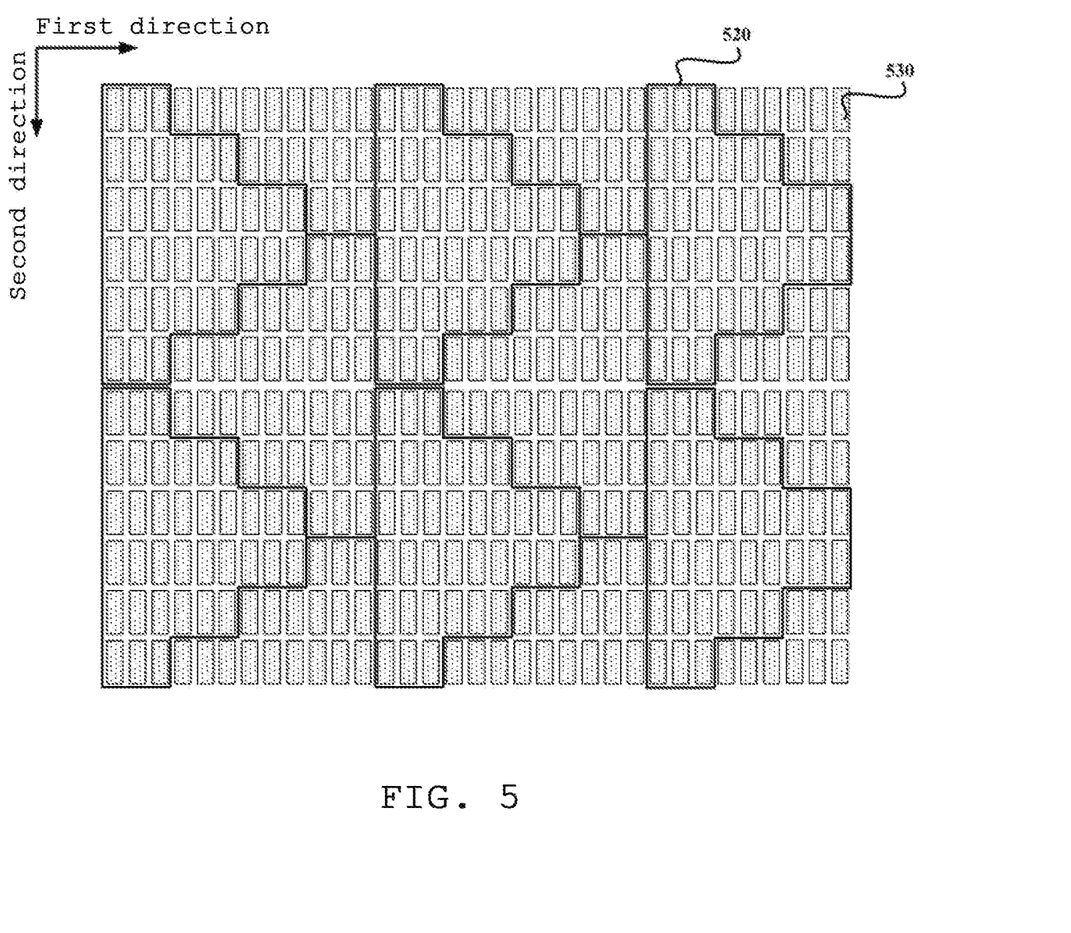
FIG. 5 is a schematic structural diagram showing the corresponding positional relationship between the touch sensing electrode array and a display pixel array in an integrated touch display panel according to another embodiment in accordance with the present disclosure.

FIG. 5 is a schematic structural diagram showing the corresponding positional relationship between the touch sensing electrode array and a display pixel array in an integrated touch display panel according to another embodiment of the present disclosure.

Similar to the embodiment shown in FIG. 2, in this embodiment, the integrated touch display panel also includes a touch emitting electrode array, a touch sensing electrode array, a black matrix, and color filters.

The touch emitting electrode array includes a plurality of touch emitting electrodes arranged along a first direction. The touch sensing electrode array includes a plurality of touch sensing electrodes 520 arranged along a second direction. An orthogonal projection of any one of the touch sensing electrodes 520 to the touch emitting electrode array at least partially overlaps with any one of the touch emitting electrodes.

The black matrix includes a plurality of black matrix rows arranged along the first direction and a plurality of black matrix columns arranged along the second direction. The color filters are separated by each of the black matrix rows and each of the black matrix columns to form a plurality of array arrangements of display pixels 530. That is to say, in FIG. 5, a black matrix column is formed between two adjacent display pixel columns, and a black matrix row is formed between two adjacent display pixel rows.

The touch sensing electrode may also be a mesh electrode, and each of metal wire grids may also have a concave polygon shape.

Unlike the embodiment shown in FIG. 2, in present embodiment, the black matrix fully covers the orthogonal projection of the mesh electrodes to the black matrix. That is, in the touch display panel of this embodiment, all the wiring forming the mesh electrodes is located in a separating region between adjacent display pixels 530, and thus all the touch sensing electrodes are covered by the black matrix.

As a result, regardless of the ambient light conditions or images displayed by the integrated touch display panel, the wiring of the touch sensing electrodes is not visually noticeable to the naked eyes, thus will not bring any adverse effect to the display effect. Compared with the embodiment shown in FIG. 2, the touch sensing electrode according to the present embodiment can further improve the display effect of the integrated touch display panel.

Further, it should be noted that although in FIG. 5, individual metal wire grids in a given touch sensing electrode 520 are electrically connected through a connecting wire 540, this is merely exemplary. As desired by the practical application scenario, the manner for electrically connecting the adjacent metal wire grids can be determined by those skilled in the art based on the technical solution disclosed in the present disclosure.

Figure 6:
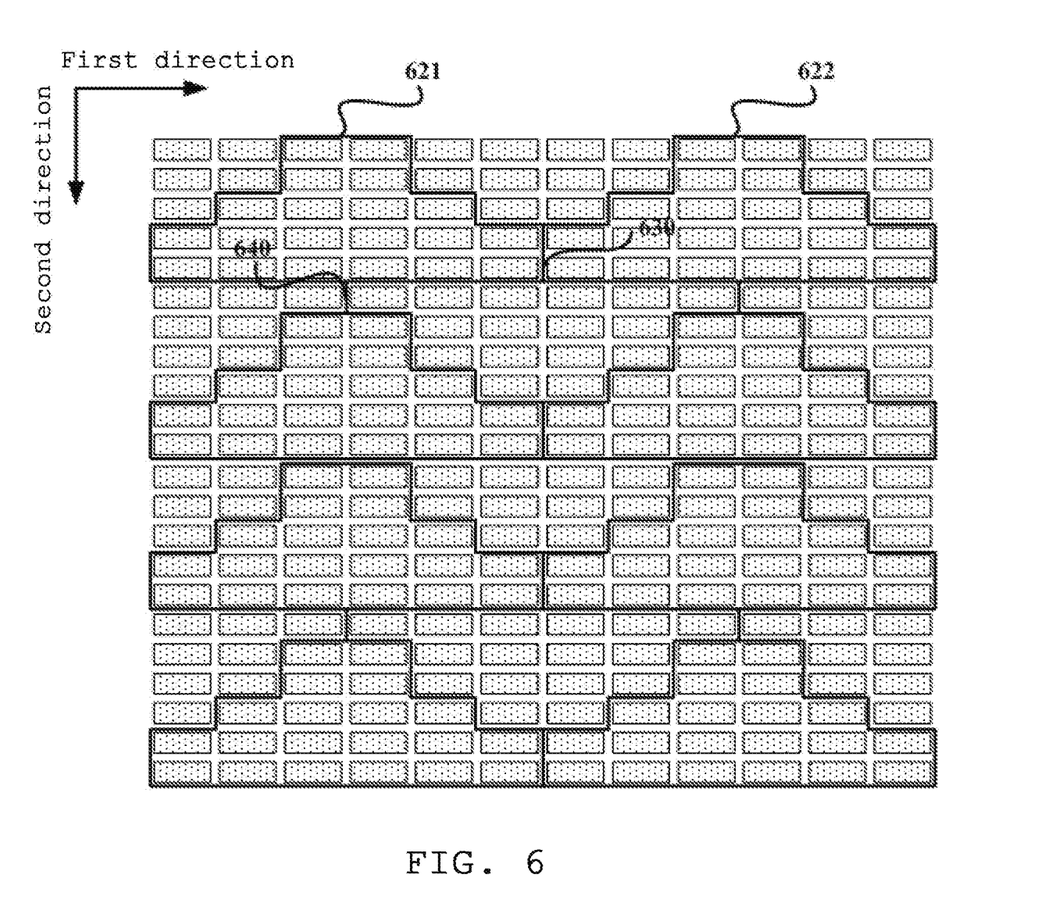
FIG. 6 is a schematic structural diagram of an optional implementation of the embodiment shown in FIG. 5.

For example, as shown in FIG. 6, in a given touch sensing electrode, each of adjacent metal wire grids (for example, metal wire grids 621 and 622) in the first direction may have a side overlapping a side of the other, and two metal wire grids adjacent in the second direction may be connected through a connecting wire 640, thereby enabling the electrical connection between adjacent metal wire grids.

Figure 7:
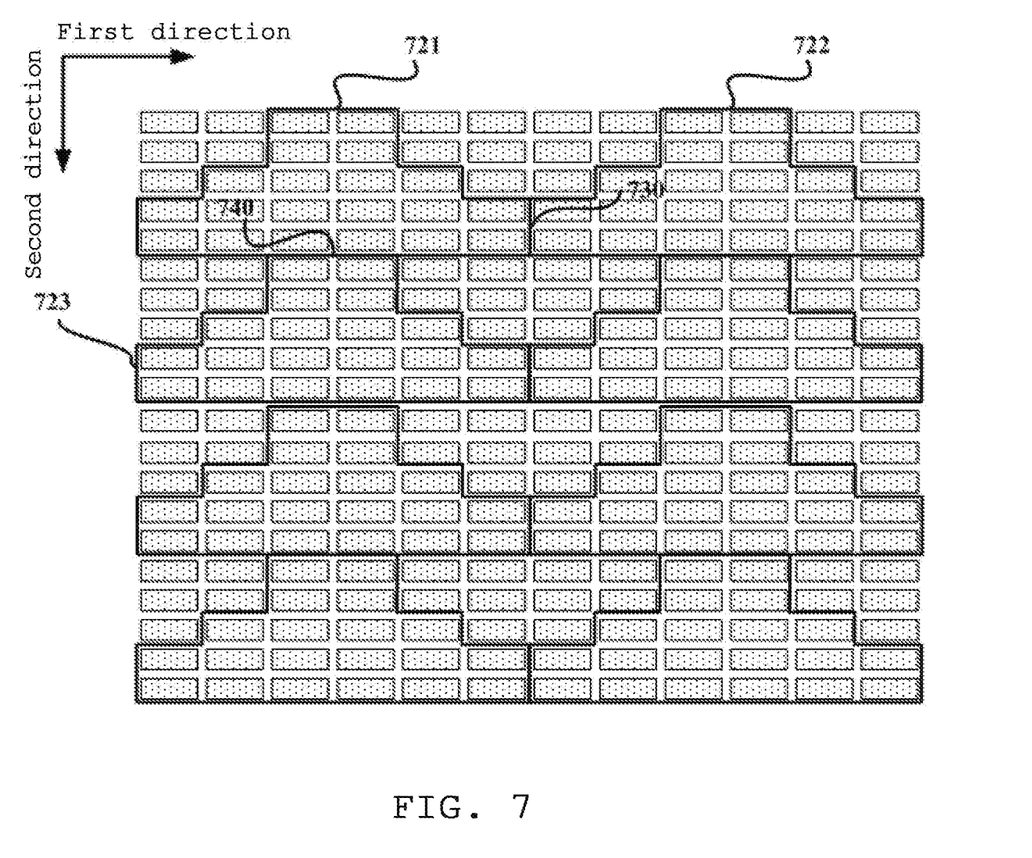
FIG. 7 is a schematic structural diagram of another optional implementation of the embodiment shown in FIG. 5.

Alternatively, as shown in FIG. 7, in a given touch sensing electrode, each of metal wire grids (for example, metal wire grids 721 and 722) adjacent in the first direction may has a side 730 overlapping a side of the other, and each of metal wire grids (for example, metal wire grids 721 and 723) adjacent in the second direction may have a side 740 that partially overlapping a side of the other, thereby enabling the electrical connection between adjacent metal wire grids.

In various embodiments in accordance with the present disclosure, each of the metal wire grids may be of an axially symmetric shape. The axially symmetric shape may have at least one symmetry axis. For example, the metal wire grid may have a first symmetry axis extending along the first direction, and/or the metal wire grid may further have a second symmetry axis extending along the second direction.

Furthermore, in some optional implementations, when the touch sensing electrode according to various embodiments of the present disclosure is fabricated, a monolithic metal mesh electrode may be fabricated at the same time, and then segmented through an etching process into a plurality of touch sensing electrodes arranged along the second direction.

Figure 8:
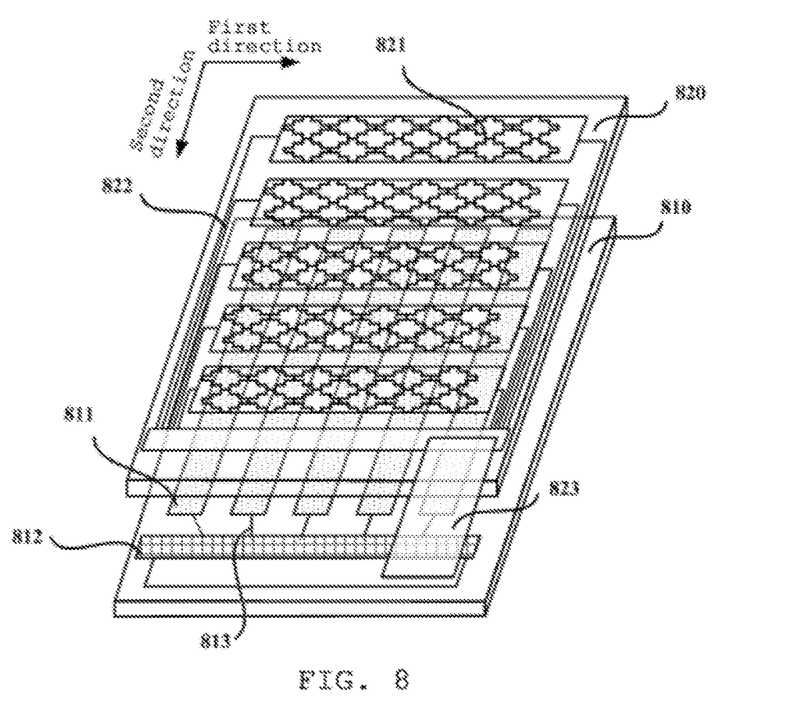
FIG. 8 is a schematic structural diagram showing an integrated touch display panel according to an embodiment of the present disclosure.

FIG. 8 is a schematic structural diagram showing an integrated touch display panel according to an embodiment of the present disclosure.

In FIG. 8, the integrated touch display panel includes an array substrate 810, and a color film substrate 820 disposed opposite to the array substrate.

A touch emitting electrode array including a plurality of touch emitting electrodes 811 may be disposed on the array substrate 810, and a touch sensing electrode array including a plurality of touch sensing electrodes 821 may be disposed on the color film substrate 820.

In some optional implementations, the touch sensing electrode array may be disposed at a side of the color film substrate 820 that is away from the array substrate 810 (as shown in FIG. 8, the touch sensing electrode array is disposed on an upper surface of the color film substrate 820), and the touch emitting electrode array may be disposed at a side of the array substrate 810 that faces the color film substrate 820.

Moreover, in some optional implementations, the array substrate 810 also has a plurality of scan lines (not shown) and data lines formed thereon (not shown), the data lines intersect with each of the scan lines. The pixel arrays are formed with the intersection of the scan lines and the data lines. Each of the scan lines may extend along the first direction, and each of the data lines may extend along the second direction. That is to say, in these optional implementations, the touch emitting electrodes 811 extends in the same direction as the data lines, and the touch sensing electrodes 821 extends in the same direction as the scan lines.

The integrated touch display panel according to the present disclosure further includes an integrated circuit 812, a plurality of touch scan signal lines 813, and a plurality of touch sensing signal lines 822.

A first end of each of the touch scan signal lines 813 is correspondingly connected to each of the touch emitting electrodes 811, and a second end of each of the touch scan signal lines 813 is connected to the integrated circuit 812. Similarly, a first end of each of the touch sensing signal lines 822 is correspondingly connected to each of the touch sensing electrodes 821, and a second end of each of the touch sensing signal lines 822 is connected to the integrated circuit 812. Because the touch sensing signal lines 822 are disposed on the color film substrate 820, and the integrated circuit 812 is disposed on the array substrate 810. To enable the electrical connection between the touch sensing signal lines 822 and the integrated circuit 812, an electrically conductive path may be formed by, for example, a flexible printed circuit (FPC) 823 connected between the touch sensing signal lines 822 and the integrated circuit 812.

The integrated circuit 812 may be used to provide a touch scan signal to each of the touch emitting electrodes 811 and receive a touch sensing signal from each of the touch sensing electrodes 821 during a touch process. For example, during the touch process, the integrated circuit 812 provides the touch scan signal sequentially to each of the touch emitting electrodes 811, and receives the touch sensing signal from all the touch sensing electrodes 821 at the same time. Based on difference of touch sensing signals sent from the touch sensing electrodes 821 to the integrated circuit 812, a touch position can be determined.

In some optional implementations, in the integrated touch display panel according to the present disclosure, the touch sensing signal lines 822 may be disposed in the same conductor layer with the touch sensing electrodes 821. Alternatively, in some other optional implementations, the touch sensing signal lines 822 may be disposed in different conductor layers with the touch sensing electrodes 821. In this case, each of the touch sensing signal lines 822 may be electrically connected to each of the touch sensing electrodes 821 through direct contacting. Alternatively, the electrical connection may be enabled by means of a through hole opened on an insulating layer between the conductor layer where the touch sensing signal lines 822 reside and the conductor layer where the touch sensing electrodes 821 reside.

In some optional implementations, in the integrated touch display panel of this embodiment, each of the touch emitting electrodes 811 may be doubled as a common electrode during a display process. In these optional implementations, the integrated circuit 812 may be further used to provide a common voltage signal to each of the touch emitting electrodes 811 during the display process, such that the liquid crystal molecules in a liquid crystal layer (not shown) formed between the array substrate 810 and the color film substrate 820 can be deflected under the action of an electric field formed by the common electrode and each pixel electrode, thereby achieving the display of an predetermined image.

The present disclosure further discloses an integrated touch display device, which may include the integrated touch display panel as described above. It should be understood by those skilled in the art that the integrated touch display device may include, in addition to the integrated touch display panel as described above, some other generally known structures. These generally known structures are not further described for the purpose of not obscuring the present disclosure.

It should be understood by those skilled in the art that the protection scope of the present disclosure is not limited to the technical solutions formed by specifically combining the above technical features, and also embraces other technical solutions formed by arbitrarily combining the above technical features or equivalents thereof without departing from the inventive concept, for example, the technical solutions formed by substituting the above technical features with/for the technical features having similar functions (without limitation) disclosed in the present disclosure.

What is claimed is:

1. An integrated touch display panel, comprising:
   a touch emitting electrode array;
   a touch sensing electrode array;
   a black matrix;
   color filters;
   an array substrate, the touch emitting electrode array being disposed on the array substrate; and
   a color film substrate, the touch sensing electrode array being disposed on a side of the color film substrate facing away from the array substrate, wherein
   the touch emitting electrode array comprises a plurality of touch emitting electrodes arranged along a first direction;
   the touch sensing electrode array comprises a plurality of touch sensing electrodes arranged along a second direction;
   an orthogonal projection of any one of the touch sensing electrodes to the touch emitting electrode array at least partially overlaps any one of the touch emitting electrodes;
   the black matrix comprises a plurality of black matrix rows arranged along the first direction and a plurality of black matrix columns arranged along the second direction;
   the color filters are separated by each of the black matrix rows and each of the black matrix columns, to form a plurality of array arrangements of display pixels; and
   the touch sensing electrode array is a mesh electrode having a polygon shape, and a part of wiring of the mesh electrode is disposed in a separating region between adjacent pixels and covered by the plurality of black matrix rows and the plurality of black matrix columns,
   the mesh electrode is a metal mesh electrode, and
   the touch sensing electrode array comprises a plurality of first metal wire grids; and
   in a given touch sensing electrode array, each of two adjacent first metal wire grids in the first direction have a common side.

2. The integrated touch display panel according to claim 1, wherein
   the touch sensing electrode array further comprises a plurality of first metal connecting wires; and
   in a given touch sensing electrode array, two first metal wire grids adjacent along the second direction are electrically connected through at least one of the first metal connecting wires.

3. The integrated touch display panel according to claim 2, wherein
   the first metal wire grid is a concave polygon shape.

4. The integrated touch display panel according to claim 1, wherein
   the touch sensing electrode array comprises a plurality of second metal wire grids;
   in a given touch sensing electrode, two adjacent second metal wire grids in the first direction have overlapping sides; and
   in the given touch sensing electrode array, two adjacent second metal wire grids in the second direction have overlapping sides.

5. The integrated touch display panel according to claim 4, wherein
   the second metal wire grid is a concave polygon shape.

6. The integrated touch display panel according to claim 5, wherein
   the second metal wire grid is an axially symmetric shape; and
   the second metal wire grid is axially symmetric with respect to a first symmetry axis extending along the first direction, and the second metal wire grid is axially symmetric with respect to a second symmetry axis extending along the second direction.

7. The integrated touch display panel according to claim 4, wherein
   the second metal wire grid is an axially symmetric shape; and
   the second metal wire grid is axially symmetric with respect to a first symmetry axis extending along the first direction, and the second metal wire grid is axially symmetric with respect to a second symmetry axis extending along the second direction.

8. The integrated touch display panel according to claim 1, further comprising a plurality of touch sensing signal lines, wherein
a first end of each of the touch sensing signal lines is correspondingly connected to each of the touch sensing electrodes.

9. The integrated touch display panel according to claim 8, wherein
the touch sensing signal lines are disposed on the same conductor layer with the touch sensing electrodes.

10. The integrated touch display panel according to claim 8, further comprising an integrated circuit and a plurality of touch scan signal lines, wherein
a first end of each of the touch scan signal lines is correspondingly connected to each of the touch emitting electrodes, and a second end of each of the touch scan signal lines is correspondingly connected to the integrated circuit;
a second end of each of the touch sensing signal lines is correspondingly connected to the integrated circuit; and
the integrated circuit is used to provide a touch scan signal to each of the touch emitting electrodes and receive a touch sensing signal from each of the touch sensing electrodes during a touch process.

11. The integrated touch display panel according to claim 10, wherein
each of the touch emitting electrodes is doubled as a common electrode during a display process; and
the integrated circuit is further used to provide a common voltage signal to each of the touch emitting electrodes during the display process.

12. The integrated touch display panel according to claim 1, wherein
the array substrate further has a plurality of scan lines and data lines formed thereon, each of the plurality of data lines intersects with each of the plurality of scan lines; and
the plurality of scan lines are arranged along the first direction, and the plurality of data lines are arranged along the second direction.

13. The integrated touch display panel according to claim 1, wherein
the array substrate further has a plurality of scan lines and data lines formed thereon, each of the plurality of data lines intersects with each of the plurality of scan lines; and
the plurality of scan lines are arranged along the second direction, and the plurality of data lines are arranged along the first direction.

14. An integrated touch display device, comprising
an integrated touch display panel, comprising:
a touch emitting electrode array;
a touch sensing electrode array;
a black matrix;
color filters;
an array substrate, the touch emitting electrode array being disposed on the array substrate; and
a color film substrate, the touch sensing electrode array being disposed on a side of the color film substrate facing away from the array substrate, wherein
the touch emitting electrode array comprises a plurality of touch emitting electrodes arranged along a first direction;
the touch sensing electrode array comprises a plurality of touch sensing electrodes arranged along a second direction;
an orthogonal projection of any one of the touch sensing electrodes to the touch emitting electrode array at least partially overlaps any one of the touch emitting electrodes;
the black matrix comprises a plurality of black matrix rows arranged along the first direction and a plurality of black matrix columns arranged along the second direction;
the color filters are separated by each of the black matrix rows and each of the black matrix columns, to form a plurality of array arrangements of display pixels; and
the touch sensing electrode array is a mesh electrode having a polygon shape, and a part of wiring of the mesh electrode is disposed in a separating region between adjacent pixels and covered by the plurality of black matrix rows and the plurality of black matrix columns,
the mesh electrode is a metal mesh electrode, and
the touch sensing electrode array comprises a plurality of first metal wire grids; and
in a given touch sensing electrode array, each of two adjacent first metal wire grids in the first direction have a common side.

* * * * *